Aug. 20, 1957 A. W. CLAYBROOK 2,803,082
FISHING FLOAT HAVING WEIGHT-ADJUSTING MEANS
Filed Nov. 4, 1955

INVENTOR.
ARTHUR W. CLAYBROOK
BY
McMorrow, Berman + Davidson
ATTORNEYS

United States Patent Office 2,803,082
Patented Aug. 20, 1957

2,803,082

FISHING FLOAT HAVING WEIGHT-ADJUSTING MEANS

Arthur W. Claybrook, Philadelphia, Pa.

Application November 4, 1955, Serial No. 544,869

3 Claims. (Cl. 43—43.14)

This invention relates to fishing floats, and more particularly has reference to a float so designed as to permit the weight (or stated otherwise, the buoyancy thereof), to be adjusted as desired by the angler.

Heretofore, it has generally been necessary to use different floats for casting different sizes and weights of baits and lures. The main object of the present invention, in this regard, is to provide a fishing float so designed as to permit the weight thereof to be adjusted, according to the particular lure, bait, or plug being cast. Thus, the float can be used for casting small, light baits and lures such as worms, bugs, artificial flies, etc. with standard plug casting rods and reels, as well as with spinning casting rods and reels. It is proposed, in this regard, to permit the correct weight of the float to be selected for different types of casting and for matching of the particular type of lure being used.

A further object of importance is to provide a float of the type referred to wherein the adjustment of the weight thereof can be effected with a minimum loss of time, and with maximum ease, the lure being designed, in this regard, to permit its being partially filled with water, with indicia being provided upon the side of the lure so that, when held under water while being filled, said indicia can be selectively registered with the water level, and will, when the water rises within the float to said level, indicate the overall weight of the float.

A further object of importance is to provide a float of the character referred to having novel means for permitting water to enter the same when the weight thereof is to be increased, or, for that matter, to leave the interior of the float when the weight is being reduced, which means will be operable merely by depression of an upwardly projecting stem with the float held in water at the desired level.

Another object of importance is to provide a float of the type referred to, wherein depression of the stem will automatically vent the float at its upper end, so that water will be free to enter the same from the lower end thereof, said depression of the stem being at the same time adapted to unseat a valve provided upon the lower end of the float.

Another object is to form the float in such a manner that on release of the depressed stem, it will automatically return to its normal position, in which position the valve is sealably engaged against its associated valve seat at the lower end of the float, and the stem is engaged in the vent opening to also seal this opening, thus sealing the float cavity to permit use of the float in casting.

Another object of importance is to provide a device of the nature referred to wherein the venting and valve-unseating stem will be so designed as to permit the connection of a line or leader to one end thereof, and the connection of a lure to its other end, with the connection being so effected as not to interfere in any way with the sealing action of the stem in the ends of the float.

Another object of importance is to provide a device of the nature referred to which can be manufactured at relatively low cost, will be so shaped as to provide a minimum of wind resistance and improved casting performance, and will further be so shaped as to improve the performance of the float in the water, by providing a smaller wake of the water during retrieve of the lure.

Other objects will appear from the following description, the claims appended thereto, and from the annexed drawing, in which like reference characters designate like parts throughout the several views, and wherein:

Figure 2:
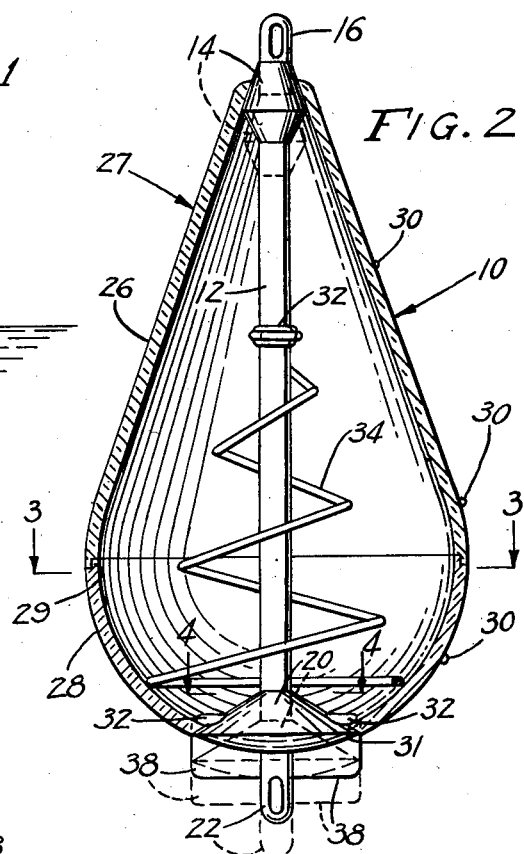
Figure 2 is an enlarged longitudinal sectional view on line 2—2 of Figure 1, the full lines showing the stem in its valve seating and vent closing position and the dotted lines showing the stem in the position in which water is free to enter or leave the float.
Figure 3:
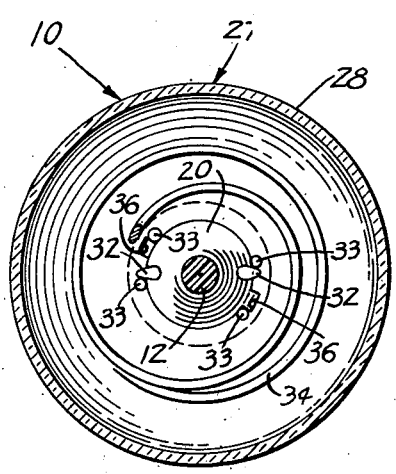
Figure 3 is a transverse section on line 3—3 of Figure 2.

The reference numeral 10 generally designates the float constituting the present invention, and as shown to particular advantage in Figure 2, the float includes an axially extending stem 12, one end of which is formed with an enlargement 14. The enlargement 14 has frustro-conical end portions, extending in opposite directions, with one of said end portions being adapted to sealably engage the upper end of the float body, in a manner to be made presently apparent.

Above the enlargement 14 the stem is formed with an extension 16 having a slot-like aperture, adapted to receive a fishing line or leader 18, extending to the rod and reel, not shown.

Adjacent its opposite ends, the stem is formed with a valve 20, said valve being of circular outer configuration and having a frustro-conical portion adapted to engage against an associated valve set on the lower end of the float body. The outer or under side of the valve 20 is curvingly shaped, to merge into the correspondingly curved or rounded lower end of the float body, and below the valve, the stem is extended as at 22 exteriorly of the float body and apertured for connection of a leader 24 extending to a lure, not shown.

The casing or shell of the float is generally designated at 27, and comprises a pair of shell sections, the upper one of which has been designated at 26 and tapers from end to end thereof, toward the upper end of the float. The upper shell section 26, at its upper end, is formed open, and the internal taper thereof matches the taper of the upper end portion of enlargement 14, as a result of which upward movement of the stem 12 relative to the shell, to the full line position shown in Figure 2, will cause said frusto-conical upper end portion of enlargement 14 to sealably engage against the inner surface of the shell, about the opening of the section 26, to normally prevent the passage of air or water through the upper end opening of the shell.

The lower shell section has been designated at 28, and is substantially hemispherical in shape, the periphery of the shell section 28, and that of the lower end of the shell section 26, interengaging in a lapped joint 29, the contacting edges of the shell sections being cemented or otherwise permanently secured together.

Figure 1:
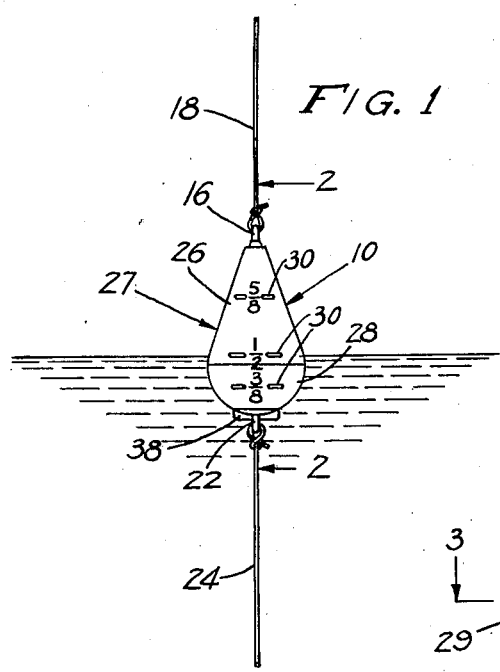
Figure 1 is a side elevational view of a float formed according to the present invention.

On the outer surface of the shell there are formed longitudinally spaced indicia in the form of lugs 30, said lugs having associated therewith numerical markings which, as shown in Figure 1, are in ascending order of value from the lower to the upper ends of the series of indicia. Thus, the lowermost marking may be the numeral "⅜," the intermediate marking may be the numeral "½" and the uppermost marking may be "⅝." These markings designate fractions of a single ounce, and are used when the weight of the float is to be adjusted to a fraction of an ounce matching that of a selected numerical indicium.

Formed upon stem 12 within the shell is a grooved, circumferential collar 32, receiving the uppermost convolution of a spiral compression spring 34 surrounding the stem and having its lower, larger end bearing against the shell section 28. This urges the stem upwardly within the shell, so that the portion 14 of the stem seals the upper end opening of the shell, while the frustro-conical valve 20 sealably engages a tapered valve seat 31, to close the opening formed centrally in the shell section 28 and bounded by said valve seat.

Integrally formed upon the frustro-conical portion of the valve disc 20 are diametrically opposed, radially, outwardly extending, tapered projections 32. On the edge portion of the bottom opening of the shell there are formed diametrically opposite pairs of small nodes or lugs 33, providing limiting stops for movement of the projections 32 in opposite directions. As a result, the valve disc is rotatably adjustable in opposite directions, through a limited distance determined by the spacing of the lugs 33 of each pair from one another.

Formed in the wall of the bottom opening of the shell, at diametrically opposite locations, are recesses 36 proportioned for entry of the projections 32, and said recess preferably are progressively increased in width and depth downwardly from the inner surface of the shell section 28, the recesses opening upon the under side of the shell section. However, the frustro-conical valve disc, when seated, closes the bottoms of the recesses so that there can be no leakage therethrough.

Figure 4:
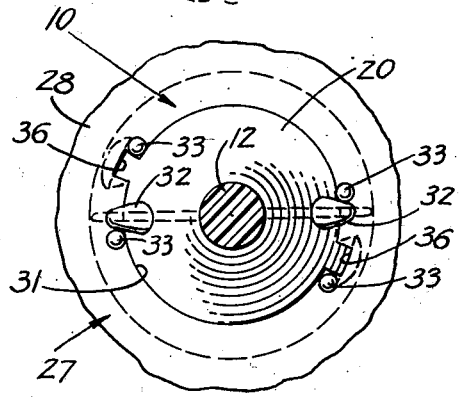
Figure 4 is an enlarged section on line 4—4 of Figure 2.

The recesses, as shown in Figure 4, are each disposed adjacent one of the lugs 33, with an unrecessed space being left between each recess and the other lug of the same pair, over which space the projection 32 is normally disposed as shown in Figure 4.

Integrally formed upon the under side of the valve disc, and projecting radially, outwardly from the stem extension 22 are coplanar wings 38, providing a handle used for rotating the stem.

In use of the float, and assuming that it is desired that the float have an overall weight of one half ounce, it is positioned in the water as shown in Figure 1, and is pushed downwardly within the water to a depth such that the lugs 30 associated with the indicium "½" will be flush with the water level. Then, the stem 12 is depressed by pressing downwardly with the thumb or finger upon the upper end extension 16 thereof, against the restraint of spring 34. With the stem held depressed, the valve will be unseated, permitting water to enter through the bottom opening of the shell, and simultaneously, there will be opened at the upper end of the shell an air vent to permit water to enter the shell through the bottom opening. With the stem depressed the water will fill to the level of the indicium "½" and on release of the stem, the water that entered the shell will be sealed therein, and the float will now have an overall weight of one-half ounce.

In this connection, preliminary to depressing the stem to permit the valve disc to be unseated, the wings 38 are grasped and the stem partially rotated so as to dispose the projections 32 in register with the recesses 36. This will permit the depression of the stem. Subsequently, when the stem is released and is pressed upwardly by the spring 34 to again seal the bottom opening, the wings 38 are grasped once again and turned in a reverse direction, to offset the projections laterally of the respective recesses 36, the projections now being in the position shown in Figure 4. The stem is thus now locked against axial movement relative to the shell, to permit regular use of the float.

It will be seen that by reason of the construction illustrated and described, the weight of the float can be swiftly adjusted, to whatever extent is necessary, thus to adapt the float for use with a particular casting lure.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A fishing float comprising a shell having openings at its opposite ends, one of said openings constituting an air vent and the other constituting a water inlet; a stem extending axially of and being rotatably mounted in the shell and projecting at its opposite ends beyond the corresponding ends of the shell, the projecting portions of the stem being adapted for connection of a fishing line and a lure carrying leader respectively; an enlargement adjacent one end of the stem adapted to normally close said air vent; a valve disk on the other end of the stem adapted to normally close said water inlet, said stem being axially shiftable within the shell in a direction to simultaneously unseat said enlargement and valve disc to open said air vent and water inlet; resilient, yielding means interposed between the stem and shell normally biasing the stem axially of the shell in an opposite direction, to hold the stem in a position in which the enlargement and valve disc will close the air vent and water inlet respectively; and means rigid with and projecting radially outwardly from said valve disc normally engaging the shell to prevent axial movement of the stem in the first named direction, in one position to which the stem is rotated, said means in another position to which the stem is rotated being disengaged from the shell to permit axial movement of the stem in the first named direction.

2. A fishing float comprising a shell having openings at its opposite ends, one of said openings constituting an air vent and the other constituting a water inlet; a stem extending axially of the shell and projecting at its opposite ends beyond the corresponding ends of the shell, the projecting portions of the stem being adapted for connection of a fishing line and a lure carrying leader respectively; an enlargement adjacent one end of the stem adapted to normally close said air vent; a valve disc on the other end of the stem adapted to normally close said water inlet, said stem being axially shiftable within the shell in a direction to simultaneously unseat said enlargement and valve disc to open said air vent and water inlet; resilient, yielding means interposed between the stem and shell normally biasing the stem axially of the shell in an opposite direction, to hold the stem in a position in which the enlargement and valve disc will close the aid vent and water inlet respectively; and means on said valve disc normally engaging the shell to prevent axial movement of the stem in the first named direction, comprising at least one projection formed on and projecting radially, outwardly of the valve disc, the shell having a recess adapted to receive said projection and communicating with the water inlet opening, said stem being rotatable within the shell to align said projection with the recess when the stem is to be shifted in the first named direction, and to offset the projection laterally of the recess when the stem is to be held against movement in said first named direction, said disc wholly closing the recess in the laterally offset position of the projection, said recess opening in a direction paralleling the axis of the stem both inwardly and outwardly of the shell for movement of the projection therethrough when the stem is axially shifted in the first named direction with the projection aligned with the recess.

3. A fishing float comprising a shell having openings at its opposite ends, one of said openings constituting an air vent and the other constituting a water inlet; a stem extending axially of the shell and projecting at its opposite ends beyond the corresponding ends of the shell, the projecting portions of the stem being adapted for connection of a fishing line and a lure carrying leader respectively; an enlargement adjacent one end of the stem adapted to normally close said air vent; a valve disc on the other end of the stem adapted to normally close said water inlet, said stem being axially shiftable within the shell in a direction to simultaneously unseat said enlargement and valve disc to open said air vent and water inlet; resilient, yielding means interposed between the stem and shell normally biasing the stem axially of the shell in an opposite direction, to hold the stem in a position in which the enlargement and valve disc will close the air vent and water inlet respectively; means on said valve disc normally engaging the shell to prevent axial movement of the stem in the first named direction, comprising at least one projection formed on and projecting radially, outwardly of the valve disc, the shell having a recess adapted to receive said projection and communicating with the water inlet opening, said stem being rotatable within the shell to align said projection with the recess when the stem is to be shifted in the first named direction, and to offset the projection laterally of the recess when the stem is to be held against movement in said first named direction, said disc wholly closing the recess in the laterally offset position of the projection, said recess opening in a direction paralleling the axis of the stem both inwardly and outwardly of the shell for movement of the projection therethrough when the stem is axially shifted in the first named direction with the projection aligned with the recess; and at least one pair of stops formed on the shell adjacent the water inlet opening, the stops of said pair being disposed at opposite sides of said projection receiving recess, to limit rotatable movement of the stem in opposite directions by engagement of the projection against the stops.

References Cited in the file of this patent

UNITED STATES PATENTS

| | | |
|---|---|---|
| 597,798 | Copperfield | Jan. 25, 1898 |
| 1,056,494 | Blee et al. | Mar. 18, 1913 |
| 1,882,321 | Hiergesell | Oct. 11, 1932 |
| 2,726,474 | Soskice | Dec. 13, 1955 |
| 2,742,908 | Lay | Apr. 24, 1956 |